US008885945B2

(12) United States Patent
Bryll et al.

(10) Patent No.: US 8,885,945 B2
(45) Date of Patent: Nov. 11, 2014

(54) METHOD FOR IMPROVING REPEATABILITY IN EDGE LOCATION RESULTS OF A MACHINE VISION INSPECTION SYSTEM

(71) Applicant: Mitutoyo Corporation, Kawasaki (JP)

(72) Inventors: Robert Kamil Bryll, Bothell, WA (US); Yuhua Ding, Kirkland, WA (US)

(73) Assignee: Mitutoyo Corporation, Kawasaki-shi ( * ) Notice: Subject to any disclaimer, the term of this patent is extended or adjusted under 35 U.S.C. 154(b) by 161 days.

(21) Appl. No.: 13/728,842

(22) Filed: Dec. 27, 2012

(65) Prior Publication Data

US 2014/0185910 A1 Jul. 3, 2014

(51) Int. Cl.
*G06K 9/48* (2006.01)
*G06K 9/64* (2006.01)
*G06K 9/46* (2006.01)

(52) U.S. Cl.
CPC ........................................ *G06K 9/46* (2013.01)
USPC .......................................... 382/199; 382/278

(58) Field of Classification Search
None
See application file for complete search history.

(56) References Cited

U.S. PATENT DOCUMENTS

| 5,151,794 | A | 9/1992 | Kumagai | |
|---|---|---|---|---|
| 6,542,180 | B1 | 4/2003 | Wasserman | |
| 6,944,324 | B2 | 9/2005 | Tran | |
| 7,324,682 | B2 | 1/2008 | Wasserman | |
| 7,454,053 | B2 | 11/2008 | Bryll | |
| 7,567,713 | B2 * | 7/2009 | Ding | 382/199 |
| 7,627,162 | B2 | 12/2009 | Blanford | |
| 7,769,222 | B2 | 8/2010 | Blanford, Jr. | |
| 7,792,622 | B2 * | 9/2010 | Wei et al. | 701/50 |
| 8,111,905 | B2 | 2/2012 | Campbell | |
| 8,111,938 | B2 | 2/2012 | Bryll | |
| 8,139,269 | B2 | 3/2012 | Goto | |
| 8,160,351 | B2 * | 4/2012 | Sandstrom et al. | 382/149 |
| 8,280,172 | B1 * | 10/2012 | Campbell et al. | 382/199 |
| 8,773,526 | B2 * | 7/2014 | Bryll | 348/94 |
| 2002/0118873 | A1 | 8/2002 | Tran | |

OTHER PUBLICATIONS

"QVPAK 3D CNC Vision Measuring Machine: Operation Guide," Version 2.0, Manual No. 4911GB, Series No. 359, Mitutoyo Corporation & Micro Encoder Inc., Kanagawa, Japan, Sep. 1996, 86 pages.
"QVPAK 3D CNC Vision Measuring Machine: User's Guide," Version 7.1, 2d ed., Manual No. 99MCB225A, Series No. 359, Mitutoyo Corporation & Micro Encoder Inc., Kanagawa, Japan, Sep. 2003, 370 pages.

\* cited by examiner

*Primary Examiner* — Anand Bhatnagar
*Assistant Examiner* — Soo Park
(74) *Attorney, Agent, or Firm* — Christensen O'Connor Johnson Kindness PLLC

(57) ABSTRACT

A method for improving repeatability in edge location measurement results of a machine vision inspection system comprises: placing a workpiece in a field of view of the machine vision inspection system; providing an edge measurement video tool comprising an edge-referenced alignment compensation defining portion; operating the edge measurement video tool to define a region of interest of the video tool which includes an edge feature of the workpiece; operating the edge measurement video tool to automatically perform scan line direction alignment operations such that the scan line direction of the edge measurement video tool is aligned along a first direction relative to the edge feature, wherein the first direction is defined by predetermined alignment operations of the edge-referenced alignment compensation defining portion; and performing edge location measurement operations with the region of interest in that position.

20 Claims, 8 Drawing Sheets

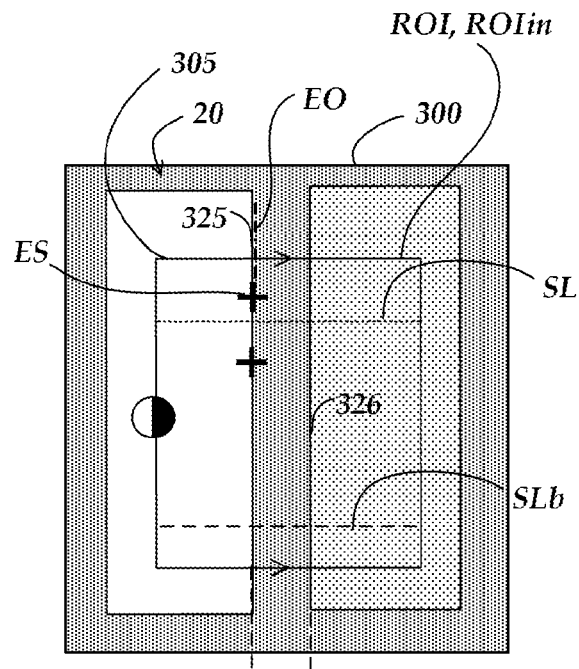
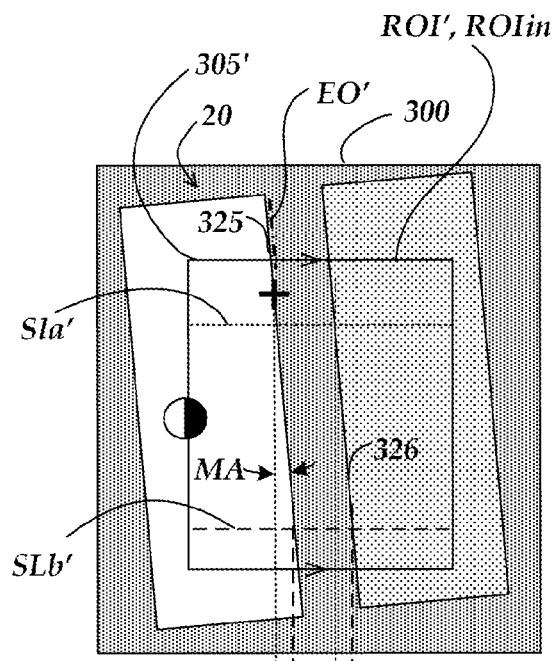
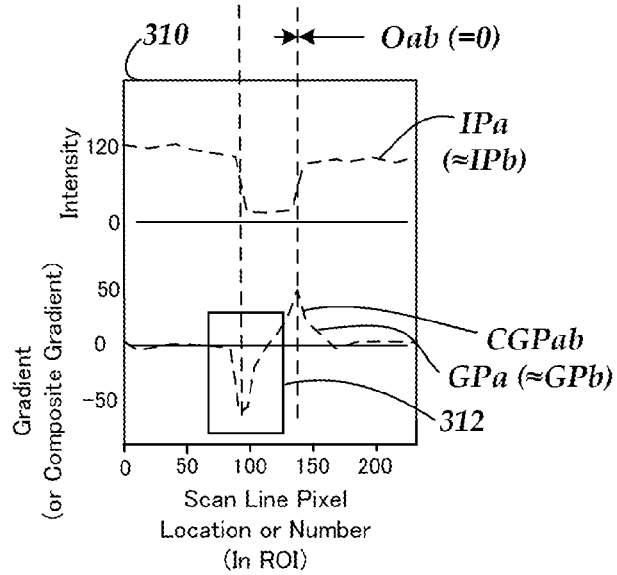
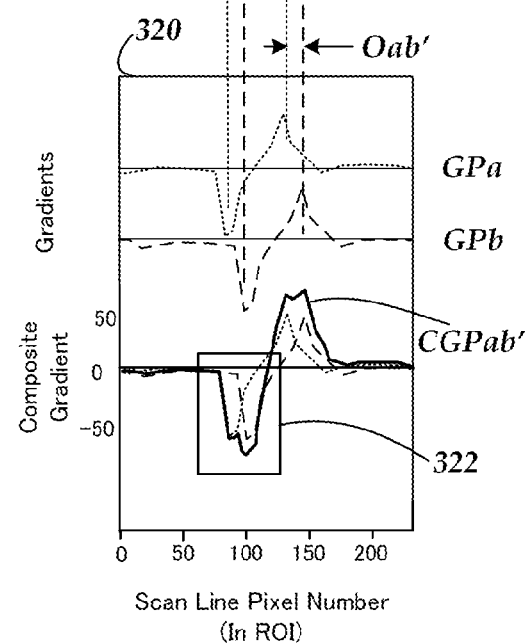
*Fig.3A.* *Fig.3B.*

METHOD FOR IMPROVING REPEATABILITY IN EDGE LOCATION RESULTS OF A MACHINE VISION INSPECTION SYSTEM

FIELD

The present application relates generally to machine vision inspection systems, and more particularly to compensating for the effects of a misalignment of a machine vision inspection system edge measurement video tool relative to an edge feature of a workpiece.

BACKGROUND

Precision machine vision inspection systems (or "vision systems" for short) can be utilized to obtain precise dimensional measurements of inspected objects and to inspect various other object characteristics. Such systems may include a computer, a camera and optical system, and a precision stage that is movable in multiple directions to allow workpiece inspection. One exemplary prior art system that can be characterized as a general-purpose "off-line" precision vision system is the commercially available QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the QVPAK 3D CNC Vision Measuring Machine User's Guide, published January 2003, and the QVPAK 3D CNC Vision Measuring Machine Operation Guide, published September 1996, each of which is hereby incorporated by reference in their entirety. This type of system is able to use a microscope-type optical system and move the stage so as to provide inspection images of either small or relatively large workpieces at various magnifications.

General purpose precision machine vision inspection systems, such as the QUICK VISION™ system, are also generally programmable to provide automated video inspection. U.S. Pat. No. 6,542,180 (the '180 patent) teaches various aspects of such automated video inspection and is incorporated herein by reference in its entirety. As taught in the '180 patent, automated video inspection metrology instruments generally have a programming capability that allows an automatic inspection event sequence to be defined by the user for each particular workpiece configuration. This can be implemented by text-based programming, for example, or through a recording mode which progressively "learns" the inspection event sequence by storing a sequence of machine control instructions corresponding to a sequence of inspection operations performed by a user with the aid of a graphical user interface, or through a combination of both methods. Such a recording mode is often referred to as "learn mode" or "training mode" or "record mode." Once the inspection event sequence is defined in "learn mode," such a sequence can then be used to automatically acquire (and additionally analyze or inspect) images of a workpiece during "run mode."

The machine control instructions including the specific inspection event sequence (i.e., how to acquire each image and how to analyze/inspect each acquired image) are generally stored as a "part program" or "workpiece program" that is specific to the particular workpiece configuration. For example, a part program defines how to acquire each image, such as how to position the camera relative to the workpiece, at what lighting level, at what magnification level, etc. Further, the part program defines how to analyze/inspect an acquired image, for example, by using one or more video tools such as edge/boundary detection video tools.

Video tools (or "tools" for short) include GUI features and predefined image analysis operations such that operation and programming can be performed by non-expert operators. Video tools may be operated by a user to accomplish manual inspection and/or machine control operations (in "manual mode"). Their set-up parameters and operation can also be recorded during learn mode, in order to create automatic inspection programs. Exemplary video tools include edge location measurement tools, which may include a tool configuration referred to as a "box tool" used to locate an edge feature of a workpiece. For example, commonly assigned U.S. Pat. No. 7,627,162, which is incorporated herein by reference in its entirety, teaches various applications of box tools. Another exemplary edge location measurement video tool is referred to as an "arc tool." For example, commonly assigned U.S. Pat. No. 7,769,222, which is incorporated herein by reference in its entirety, teaches various applications of arc tools.

Various methods are known for locating edge features in workpiece images. For example, various algorithms are known which apply brightness gradient operators to images which include an edge feature to determine its location, e.g., a Canny Edge detector or a differential edge detector. Such edge detection algorithms may be included in the machine vision inspection systems (e.g., in video tools) which also use carefully configured illumination and/or special image processing techniques to enhance brightness gradients or otherwise improve edge location measurement accuracy and repeatability. However, it remains difficult to measure the location of certain edges with the desired level of repeatability, for example, "noisy" edges, such as the edges of irregular surfaces or irregular edges produced by sawing or laser cutting, and/or closely spaced edges. Video tools and/or automatic operations that allow non-expert users to measure such edges with improved reliability and/or repeatability would be desirable.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

Misalignment of a machine vision inspection system edge measurement video tool relative to an edge feature of a workpiece may limit the utility, reliability and/or accuracy of that video tool. Conversely, compensating for that misalignment (e.g., either mathematically or by actually correcting the misalignment) may increase the utility, reliability and/or accuracy of that video tool, as described in greater detail below. However, it may be difficult for relatively unskilled users to understand how to compensate for, or correct, misalignment to the degree that may be desirable in order to obtain the most reliable and accurate measurements of an edge (e.g., at the micron or sub-micron level, which may require sub-pixel interpolation to determine the edge location). This is particularly true when measuring noisy edges, or closely spaced edges. Therefore, it may be useful to include an automatic edge-referenced alignment compensation feature as disclosed herein in a machine vision inspection system for a number of reasons, particularly in relation to noisy edges.

As a first example, in order to preserve the edge location as well as possible when performing directional averaging and/ or directional filtering (e.g., to combine intensity data from parallel scan lines so that the noise along any particular scan line tends to be averaged out by the combination of the scan lines), the offset (if any) of one scan line relative to the next must be determined such that corresponding pixels of the scan lines are properly combined by the averaging or filtering operation. In this case, much of the benefit may be gained by using intensity data determined along an original scan line direction, and mathematically compensating for an offset between the scan lines (e.g., an offset expressed as the difference in location of the same workpiece feature along adjacent scan lines, expressed as a number of pixels with subpixel resolution), such that comparable features along the respective scan lines are properly combined. In this case, the offset of an edge feature along various scan lines may be characterized by analyzing a plurality of the scan lines, and the characterized offset(s) may be considered as the edge-referenced alignment compensation.

As a second example, in order to determine an edge location most accurately, it may be advantageous to arrange the intensity scan line perpendicular to the edge, such that the edge width is minimized and the gradient across the edge is maximized. In this case, the benefit is obtained by computing an intensity scan line actually arranged perpendicular to the edge (e.g., based on previously obtained image data). Computing an intensity scan line along a desired direction based on previously obtained image data is taught, for example, in U.S. Pat. No. 7,567,713 to Ding, which is hereby incorporated herein by reference in its entirety. In this case, the adjustment of the intensity scan line direction such that it is actually perpendicular to the edge may be considered as the edge-referenced alignment compensation.

As a third example, in order to distinguish between closely spaced edges, and particularly between closely spaced noisy edges within a region of interest, an offset such as that outlined above between adjacent scan lines may be used as a basis for various combinations of a scanline data such that data related to the various closely spaced edges can be more reliably grouped for analysis (e.g., statistical analysis to eliminate detected edge point outliers along a first edge, a second edge, and the like) with less risk of mistaking second-edge points for first-edge points, and vice versa. In this case, the offset of an edge feature along various scan lines may be characterized by analyzing a plurality of the scan lines, and the characterized offset(s) may be considered as the edge-referenced alignment compensation. However, to distinguish between closely spaced edges even more reliably, it may be even more advantageous to determine intensity scan lines that are perpendicular to the edge as outlined above in the second example. This will tend to define each edge (e.g., its detected edge points) most accurately, which should benefit any additional analysis performed based on the detected edge points, whether that analysis is intended to discriminate one edge from another or locate a particular edge most accurately, or the like. In this case, the adjustment of the intensity scan line direction such that it is actually perpendicular to the edge may be considered as the edge-referenced alignment compensation.

As a fourth example, it should be appreciated that when a part program is created, the parameters characterizing a particular workpiece edge that is to be located by an edge detection video tool (also referred to as the "learned" edge parameters) will be based on video tool scan lines as they are oriented relative to the edge during learn mode. In contrast, when that part program is run to automatically detect the corresponding edge on a different workpiece during a run mode, the workpiece edge may be rotated to a slightly different angle relative to the programmed video tool, leading to a slightly different edge width and gradient along the runtime scan line, which makes it more likely that the learned edge parameters will fail to match the characteristics of the run mode scan lines.

It will be appreciated that for noisy edges in particular, reliable edge detection is inherently difficult, and the margin for such errors may be minimal. Therefore, to increase edge detection reliability in such cases, it may be desirable to ensure that the run mode scan line orientation relative to an edge feature is as similar as possible to the learn mode scan line orientation, which will increase the likelihood of a match between the learned edge parameters included in a part program and the observed edge characteristics during run mode. In this case, in one embodiment, the adjustment of the intensity scan line direction such that it is actually perpendicular to the edge during learn mode and/or run mode may be considered as the edge-referenced alignment compensation. In another embodiment, the actual orientation of the intensity scan line direction relative to the edge, or another characterization of the intensity scan line direction (e.g., a composite scan line intensity profile formed by assuming no offset between the scan lines inherently characterizes the intensity scan line direction relative to the edge) may be determined and recorded during learn mode, and then the run mode scan line orientation relative to the edge may be adjusted to best match the actual scan line orientation or other characterization recorded during learn mode (e.g., a scan line, or composite scan line, intensity or gradient profile). In this case, the adjustment of the run mode scan line orientation relative to the edge such that it matches the actual scan line orientation relative to the edge or other scan line characterization recorded during learn mode may be considered as the edge-referenced alignment compensation.

As outlined above, arranging an intensity scan line such that it is actually perpendicular to an edge may be performed computationally based on previously obtained image data. It will be appreciated that, alternatively, a workpiece and camera may be rotated relative to one another, such that pixel rows or columns of the camera define the scan line direction and are oriented along a desired direction (e.g., perpendicular) relative to the edge on the workpiece, although this may be a time-consuming or impossible alternative in many machine vision systems and, therefore, may not be preferred in such systems. Various methods of determining when a scanline is oriented along a desired direction (e.g., perpendicular) relative to an edge are described further below.

Disclosed herein is a method for improving repeatability and/or robustness in edge location measurement results in a video tool of a machine vision inspection system. The machine vision inspection system may comprise an edge measurement video tool comprising a region of interest portion, wherein the edge measurement video tool is configured to detect edge points along a plurality of scan lines in the region of interest such that an edge location measurement may be determined based on the detected edge points. The method comprises: placing a workpiece in a field of view of the machine vision inspection system, operating the edge measurement video tool to define a region of interest, including an edge feature, in an acquired image of the workpiece, and operating the edge measurement video tool to automatically determine scan line data comprising an intensity profile along a plurality of scan lines across the edge feature in the region of interest. The plurality of scan lines are analyzed in order to provide an edge-referenced alignment compensation related to a respective offset amount of the edge feature along respective scan lines of the analyzed plurality of scan lines, wherein the edge-referenced alignment compensation is usable to adjust the scan line data of the edge measurement video tool such that the respective offset amount of the edge feature along respective scan lines is at least one of (a) substantially removed, (b) substantially compensated, and (c) substantially matched to a previously determined respective offset amount of a corresponding edge feature along respective scan lines.

In some embodiments, the edge measurement video tool may comprise a user interface including at least a region of interest indicator superimposed on an image of the workpiece, and the method may further comprise providing an indication that the edge-referenced alignment compensation has been provided by adjusting a user interface element that is superimposed on the image of the workpiece in the user interface. In some such embodiments, adjusting the user interface element may comprise changing a property of one or more elements that are superimposed on the image of the workpiece (e.g., their color, or line type, or the like), or adding an edge-referenced alignment compensation indicator (e.g., and icon or a widget) superimposed on the image.

In some such embodiments (e.g., embodiments wherein the scan lines are adjusted to be perpendicular to the edge feature, which may remove the offset), adjusting the user interface element may comprise adjusting at least one of the region of interest indicator, an edge direction indicator, and a scan line indicator to indicate that a scan line direction of the video tool is perpendicular to the edge feature. When the video tool is a box tool, adjusting the user interface element may comprise rotating the region of interest indicator such that one of its axes is perpendicular to the edge feature, or rotating the edge direction indicator such that it is parallel to the edge feature, or rotating the scan line indicator such that it is perpendicular to the edge feature. It will be understood that adjusting the user interface element may also comprise translation in some embodiments or applications. When the video tool is one of a circle tool and an arc tool, adjusting the user interface element may comprise positioning the region of interest indicator such that its boundaries are approximately concentric with the edge feature, or positioning the edge direction indicator such that it is approximately concentric with the edge feature, or positioning the scan line indicator such that it is perpendicular to the edge feature.

In some such embodiments, the edge-referenced alignment compensation determines the respective offset amount(s), and it is used to adjust the scan line data such that the respective offset amount of the edge feature along respective scan lines is substantially compensated. In such embodiments, adjusting the user interface element may comprise adjusting at least one of the region of interest indicator, an edge direction indicator, and a display representing detected edge points, to symbolically represent the respective offset amount(s). When the video tool is a box tool, adjusting the user interface element may comprise shaping the region of interest indicator to include a side approximately parallel to the edge feature, or rotating the edge direction indicator such that it is parallel to the edge feature, or displaying the representation of detected edge points or a line fit to the detected edge points approximately along the edge feature. When the video tool is one of a circle tool and an arc tool, adjusting the user interface element may comprise shaping the region of interest indicator such that its curved boundaries are approximately concentric with the edge feature, or positioning the edge direction indicator such that its curve is approximately concentric with the edge feature, or displaying the representation of detected edge points or an arc fit to the detected edge points approximately along the edge feature.

In various embodiments, the implementation of the method may comprise one of (a) selecting the edge measurement video tool such that it is a type that includes edge-referenced alignment compensation operations, (b) selecting an edge-referenced alignment compensation mode or option of the edge measurement video tool which includes edge-referenced alignment compensation operations, (c) selecting a directional filtering mode or option of the edge measurement video tool which includes edge-referenced alignment compensation operations, and (d) selecting an edge-referenced alignment compensation tool that provides edge-referenced alignment compensation operations that operate in conjunction with the edge measurement video tool. In such embodiments, the step of analyzing the plurality of scan lines in order to provide the edge-referenced alignment compensation may comprise executing the edge-referenced alignment compensation operations in conjunction with operations of the edge measurement video tool.

In some cases, the method is performed during a learn mode of the machine vision system and corresponding operations are recorded in a part program. In other cases, at least some steps of the method are performed during a run mode of the machine vision system by executing corresponding operations recorded in a part program.

In some embodiments, the method may further comprise applying the edge-referenced alignment compensation to adjust the scan line data of the edge measurement video tool such that the respective offset amount of the edge feature along respective scan lines as reflected in the detected edge points of the edge measurement video tool is at least one of (a) substantially zero, (b) substantially compensated, and (c) substantially matched to a previously determined respective offset amount of a corresponding edge feature along respective scan lines.

In some embodiments, providing the edge-referenced alignment compensation comprises characterizing the respective offset amount of the edge feature along respective scan lines. In some such embodiments, the edge measurement video tool is one of a box tool, a circle tool, and an arc tool, and characterizing the respective offset amount of the edge feature along respective scan lines comprises detecting edge points, fitting a line shape associated with the video tool to the edge points, and characterizing the respective offset amount of the fitted line along respective scan lines. When the video tool is a box tool, the respective scan lines may be parallel to one another, the line shape associated with the video tool is a straight line, and characterizing the respective offset amount of the fitted line along respective scan lines may comprise determining an angle between the fitted line and the respective scan lines. When the edge measurement video tool is a circle tool, the respective scan lines may all be along radii extending from a center of the circle tool, the line shape associated with the video tool is a circle, and characterizing the respective offset amount of the fitted line along respective scan lines may comprise determining where the fitted circle intersects the respective scan lines.

In some embodiments, providing the edge-referenced alignment compensation comprises adjusting the scan lines of the edge measurement video tool such that the scan lines are substantially perpendicular to the edge feature.

In some embodiments, providing the edge-referenced alignment compensation comprises determining a learn mode composite scan line based on a plurality of contributing learn mode scan lines that include the respective offset amount of a representative learn mode edge feature along the respective contributing learn mode scan lines during a learn mode of the machine vision system, and operations corresponding to the method are stored in a part program including a stored representation of the learn mode composite scan line. In some such embodiments, the method may further comprise executing the part program during a run mode of the machine vision system, comprising: adjusting the scan lines of an edge measurement video tool during the run mode based on determining a run mode composite scan line based on a plurality of run mode contributing scan lines that include the respective offset amount of a run mode edge feature corresponding to the representative learn mode edge feature along the respective run mode contributing scan lines, wherein the run mode scan lines are adjusted based on approximately maximizing a match of the run mode composite scan line to the learn mode composite scan line. In some such embodiments, the learn mode scan lines may be adjusted during learn mode such that a gradient corresponding to the representative edge feature in the learn mode composite scan line is approximately maximized.

In some embodiments, scan lines may be defined relative to the video tool (e.g., the video tool region of interest), and adjustment of the scan lines may comprise adjustment of a feature of the region of interest. Thus, it will be appreciated that scan lines may be adjusted directly or indirectly in various embodiments.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 3A and 3B show a straight edge feature in a field of view of a user interface and compare offset amounts of an edge feature along scan lines associated with an aligned video tool in FIG. 3A and a misaligned video tool in FIG. 3B, as well as related effects in corresponding scan line intensity gradients;

DETAILED DESCRIPTION

Figure 1:
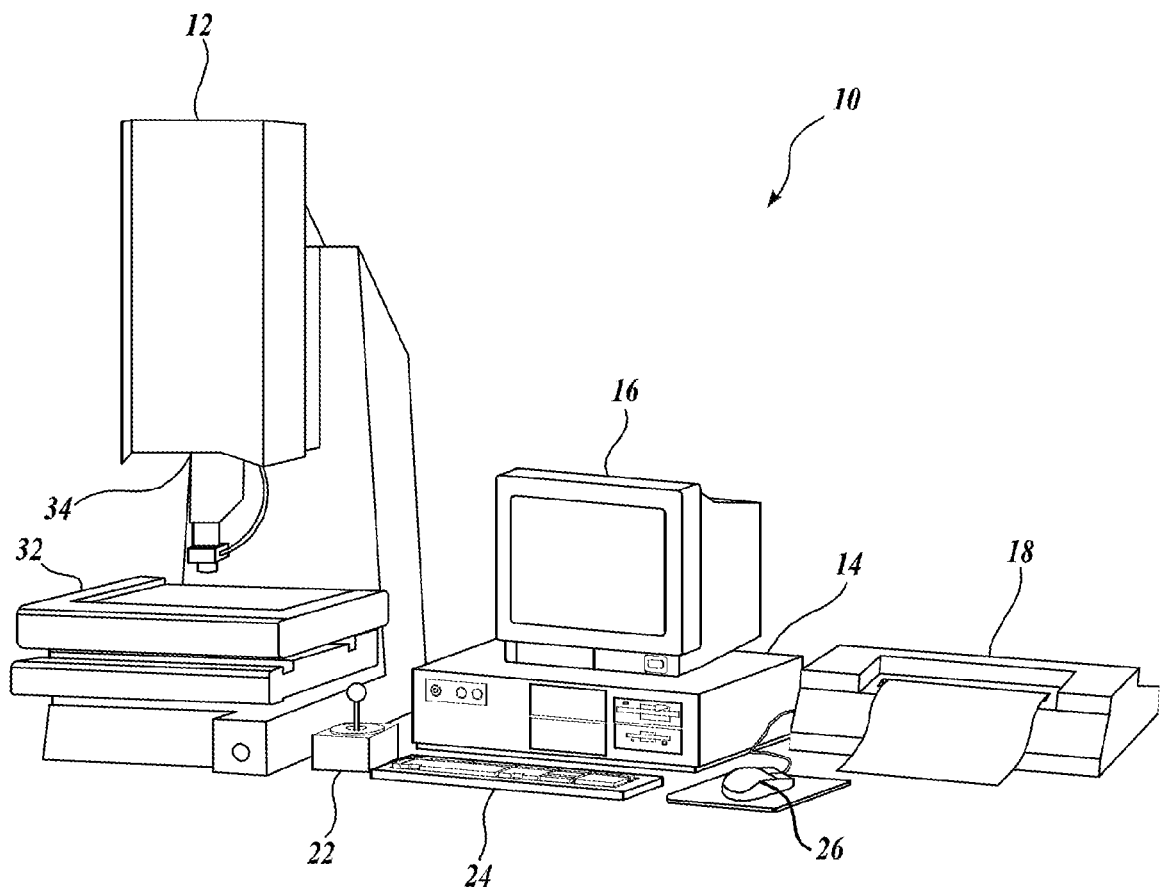
FIG. 1 is a diagram showing various typical components of a general purpose precision machine vision inspection system.

FIG. 1 is a block diagram of one exemplary machine vision inspection system 10 usable in accordance with methods described herein. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10. It will be appreciated that in various embodiments, a touchscreen tablet or the like may be substituted for and/or redundantly provide the functions of any or all of the computer system 14, the display 16, the joystick 22, a keyboard 24, and the mouse 26.

The vision measuring machine 12 includes a moveable workpiece stage 32 and an optical imaging system 34 which may include a zoom lens or interchangeable lenses. The zoom lens or interchangeable lenses generally provide various magnifications for the images provided by the optical imaging system 34. The machine vision inspection system 10 is generally comparable to the QUICK VISION® series of vision systems and the QVPAK® software discussed above, and similar state-of-the-art commercially available precision machine vision inspection systems. The machine vision inspection system 10 is also described in commonly assigned U.S. Pat. Nos. 7,454,053, 7,324,682, 8,111,905, and 8,111,938, which are each incorporated herein by reference in their entireties.

Figure 2:
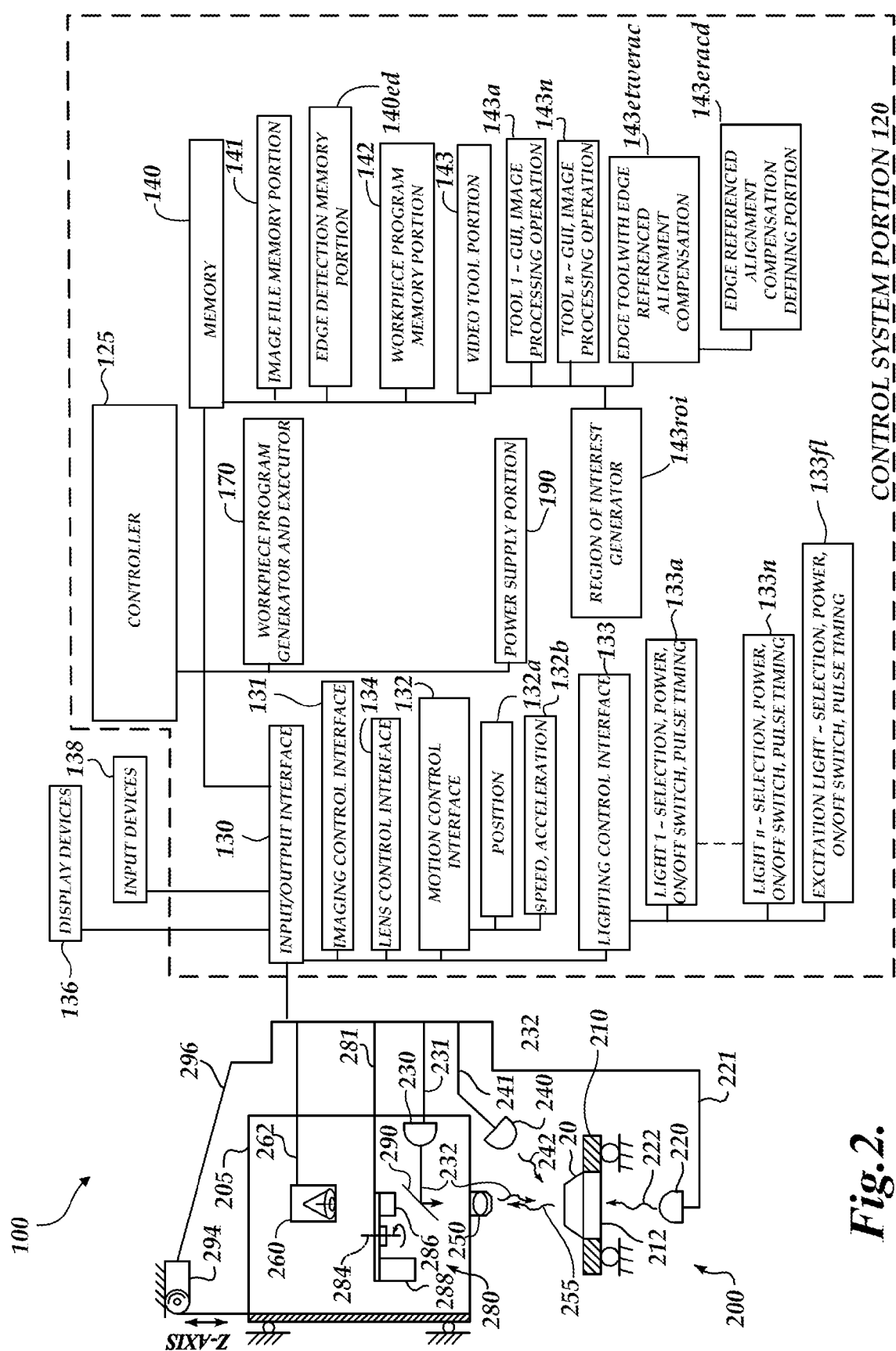
FIG. 2 is a block diagram of a control system portion and a vision components portion of a machine vision inspection system similar to that of FIG. 1, and including an edge-referenced alignment compensation portion.

FIG. 2 is a block diagram of a control system portion 120 and a vision components portion 200 of a machine vision inspection system 100 similar to the machine vision inspection system 10 of FIG. 1. As will be described in more detail below, the control system portion 120 is utilized to control the vision components portion 200. The vision components portion 200 includes an optical assembly portion 205, light sources 220, 230, and 240, and a workpiece stage 210 having a central transparent portion 212. The workpiece stage 210 is controllably movable along X and Y axes that lie in a plane that is generally parallel to the surface of the stage where a workpiece 20 may be positioned. The optical assembly portion 205 includes a camera 260, a beam splitter/mirror 290, an interchangeable objective lens 250, and may include a turret lens assembly 280 having lenses 286 and 288. Alternatively to the turret lens assembly, a fixed or interchangeable magnification-altering lens, or a zoom lens configuration, or the like, may be included. An interchangeable lens may be interchanged manually or automatically.

The optical assembly portion 205 is controllably movable along a Z-axis that is generally orthogonal to the X and Y axes, by using a controllable motor 294 that drives an actuator to move the optical assembly portion 205 along the Z-axis to change the focus of the image of the workpiece 20. The controllable motor 294 is connected to the input/output interface 130 via a signal line 296.

A workpiece 20, or a tray or fixture holding a plurality of workpieces 20, which is to be imaged using the machine vision inspection system 100 is placed on the workpiece stage 210. The workpiece stage 210 may be controlled to move relative to the optical assembly portion 205, such that the interchangeable objective lens 250 moves between locations on a workpiece 20, and/or among a plurality of workpieces 20. One or more of a stage light 220, a coaxial light 230, and a surface light 240 (e.g., a ring light) may emit source light 222, 232, and/or 242, respectively, to illuminate the workpiece or workpieces 20.

The light source 230 may emit light 232 along a path including a beam splitter/mirror 290. The source light is reflected or transmitted as workpiece light 255, and the workpiece light used for imaging passes through the interchangeable objective lens 250 and the turret lens assembly 280 and is gathered by the camera 260. The images of the workpiece(s) 20, from the camera 260, are output on a signal line 262 to the control system portion 120. The light sources 220, 230, and 240 may be connected to the control system portion 120 through signal lines or busses 221, 231, and 241, respectively. To alter the image magnification, the control system portion 120 may rotate the turret lens assembly 280 along axis 284 to select a turret lens, through a signal line or bus 281.

As shown in FIG. 2, in various exemplary embodiments, the control system portion 120 includes a controller 125, the input/output interface 130, a memory 140, a workpiece program generator and executor 170, and a power supply portion 190. Each of these components, as well as the additional components described below, may be interconnected by one or more data/control buses and/or application programming interfaces, or by direct connections between the various elements.

The input/output interface 130 includes an imaging control interface 131, a motion control interface 132, a lighting control interface 133, and a lens control interface 134. The motion control interface 132 may include a position control element 132a, and a speed/acceleration control element 132b although such elements may be merged and/or indistinguishable. The lighting control interface 133 includes lighting control elements 133a-133n, and 133fl which control, for example, the selection, power, on/off switch, and strobe pulse timing if applicable, for the various corresponding light sources of the machine vision inspection system 100.

The memory 140 may include an image file memory portion 141, a workpiece program memory portion 142 that may include one or more part programs, or the like, and a video tool portion 143. As illustrated, the video tool portion 143 includes representative video tool portions 143a and 143n, which determine the GUI, image processing operation, etc., for each of the corresponding video tools. Also, the video tool portion 143 may include, in particular, an edge tool with edge-referenced alignment compensation 143*etwerac* as described in greater detail below, which may include edge location measurement operations described with respect to a "box tool" and an "arc tool," in the QVPAK 3D CNC Vision Measuring Machine Operation Guide, for example, and which may incorporate signal processing to implement the methods disclosed herein. The video tool portion 143 also includes a region of interest (ROI) generator 143*roi* that supports automatic, semi-automatic and/or manual operations that define various ROIs that are operable in various video tools included in the video tool portion 143. In some embodiments, the edge tool with edge-referenced alignment compensation 143*etwerac* may operate in conjunction with, or to supplement the operation of, the region of interest (ROI) generator 143*roi* in order to adjust an initial orientation or position of the region of interest and associated scan line directions, to align a video tool region of interest with an edge feature to improve repeatability of edge location measurements, as described in greater detail below.

In the context of this disclosure, and as known by one of ordinary skill in the art, the term video tool generally refers to a relatively complex set of automatic or programmed operations that a machine vision user can implement through a relatively simple user interface (e.g., a graphical user interface, editable parameter windows, menus, and the like), without creating the step-by-step sequence of operations included in the video tool or resorting to a generalized text-based programming language, or the like. For example, a video tool may include a complex pre-programmed set of image processing operations and computations which are applied and customized in a particular instance by adjusting a few variables or parameters that govern the operations and computations.

In addition to the underlying operations and computations, the video tool comprises the user interface that allows the user to adjust those parameters for a particular instance of the video tool. For example, many machine vision video tools allow a user to configure a graphical region of interest (ROI) indicator through simple "handle dragging" operations using a mouse, in order to define the location parameters of a subset of an image that is to be analyzed by the image procession operations of a particular instance of a video tool. It should be noted that the visible user interface features are sometimes referred to as the video tool, with the underlying operations being included implicitly.

In common with many video tools and/or video tool features and operations, the edge-referenced alignment compensation subject matter of this disclosure includes both user interface features and underlying image processing operations, and the like, and the related features may be characterized as features of an edge measurement video tool with or including edge-referenced alignment compensation 143*etwerac* that is included in the video tool portion 143. The edge tool with edge-referenced alignment compensation 143*etwerac* provides operations which may be used to automatically provide edge-referenced alignment compensation for detecting or locating an edge feature to improve the repeatability of related edge location measurements.

The edge tool with edge-referenced alignment compensation 143*etwerac* may include an edge-referenced alignment compensation defining portion 143*eracd* that automatically or semi-automatically determines the desired compensation. In one embodiment, the alignment compensation defining portion 143*eracd* may adjust the scan line direction used by the edge tool 143*etwerac*, and the adjustment of the intensity scan line direction (e.g., such that it is perpendicular to the edge feature that is to be located) may be considered as the edge-referenced alignment compensation.

In another embodiment, the alignment compensation defining portion 143*eracd* may characterize the offset of the edge feature along various scan lines by analyzing a plurality of the scan lines, and the characterized offset(s) may be considered as the edge-referenced alignment compensation. The characterized offset(s) may be used to mathematically compensate for the offset(s) when performing various additional operations that compare or combine the scan lines, for example, as described further below.

Various tool parameters and/or offset characterizations determined during learn mode operations of the edge tool 143*etwerac* may be determined and stored in a part program during learn mode, as described in greater detail below. The video tool portion 143 may also, or instead, include a conventional edge measurement video tool which operates according to known edge detection or location methods.

In one embodiment, the edge-referenced alignment compensation defining portion 143*eracd* may be linked or otherwise act in conjunction with such a tool. For example, in one embodiment, the edge-referenced alignment compensation operations disclosed herein may be included as an edge-referenced alignment compensation mode in a multi-mode edge detector or location tool that includes modes comparable to the known edge detection tools (e.g., a known box tool, arc tool, circle tool, etc.).

In some embodiments, the edge tool with edge-referenced alignment compensation 143*etwerac* and the known or conventional edge tool(s) may be separate tools, but in some embodiments they may be two modes of a single edge tool. In some embodiments where they are two modes of a single edge tool, the particular mode may be chosen by the edge tool based on manual and/or automatic learn mode operations (e.g., based on how irregular or noisy the edge is, and/or whether its nominal shape is known), as described further below.

The signal lines or busses 221, 231 and 241 of the stage light 220, the coaxial lights 230 and 230', and the surface light 240, respectively, are all connected to the input/output interface 130. The signal line 262 from the camera 260 and the signal line 296 from the controllable motor 294 are connected to the input/output interface 130. In addition to carrying image data, the signal line 262 may carry a signal from the controller 125 that initiates image acquisition.

One or more display devices 136 (e.g., the display 16 of FIG. 1) and one or more input devices 138 (e.g., the joystick 22, keyboard 24, and mouse 26 of FIG. 1) can also be connected to the input/output interface 130. The display devices 136 and input devices 138 can be used to display a user interface, which may include various graphical user interface (GUI) features that are usable to perform inspection operations, and/or to create and/or modify part programs, to view the images captured by the camera 260, and/or to directly control the vision system components portion 200.

In various exemplary embodiments, when a user utilizes the machine vision inspection system 100 to create a part program for the workpiece 20, the user generates part program instructions by operating the machine vision inspection system 100 in a learn mode to provide a desired image acquisition training sequence. For example, a training sequence may comprise positioning a particular workpiece feature of a representative workpiece in the field of view (FOV), setting light levels, focusing or autofocusing, acquiring an image, and providing an inspection training sequence applied to the image (e.g., using an instance of one of the video tools on that workpiece feature). The learn mode operates such that the sequence(s) are captured or recorded and converted to corresponding part program instructions. These instructions, when the part program is executed, will cause the machine vision inspection system to reproduce the trained image acquisition and inspection operations to automatically inspect that particular workpiece feature (that is the corresponding feature in the corresponding location) on a run mode workpiece or workpieces which matches the representative workpiece used when creating the part program.

FIGS. 3A and 3B show a straight edge feature in a field of view of a user interface and compare offset amounts of an edge feature along scan lines associated with an aligned video tool 305 in FIG. 3A and a misaligned video tool 305' in FIG. 3B, as well as related effects in corresponding scan line intensity gradients.

FIG. 3A shows a field of view window 300 including an image of a workpiece 20 (e.g., imaged by the camera 260), which may be included in a user interface of the machine vision inspection system (e.g., the machine vision inspection system 100). In FIG. 3A, a dashed line illustrates an edge orientation EO of the edge 325 in the image, for purposes of explanation. A region of interest ROI defines a relevant portion of the edge 325, as indicated by the region of interest indicator ROIin. In one embodiment, the region of interest generator 143*roi* may be operated in conjunction with the edge tool 143*etwerac* to define the region of interest ROI. For purposes of explanation, FIG. 3A also shows two exemplary parallel scan lines SLa and SLb, which may or may not actually be displayed in the edge tool user interface, in various embodiments. Also shown is an edge selector ES, which may be positioned by a user in some embodiments to indicate or mark an edge that is desired to be detected. A second edge 326 is also labeled in FIG. 3A, which is not the edge to be detected.

The lower part of FIG. 3A is a chart 310 which shows an intensity profile IPa and a corresponding intensity gradient profile GPa (the rate of change of intensity), at pixel locations (e.g., pixel numbers) along the scan line SLa. As is known in the art, it is conventional to identify an edge point along a scan line as the location where the maximum gradient occurs (e.g., at the extremum in the box 312). FIG. 3A shows an example where the region of interest is aligned with the edge 325 and the scan lines are arranged perpendicular to the edge 325. Due to this alignment, assuming the edge 325 is approximately straight and uniform, the intensity profile and gradient profile of the scan line SLb will be approximately the same as for the scan line SLa, and the edge 325 will occur at approximately the same location along the scan lines SLa and SLb. This means that the edge 325 is not "offset" along one of the scan lines relative to the other, that is, the offset Oab of the edge along one scan line relative to the other will be approximately zero.

Because of these properties of scan lines that are aligned relative to the edge, a normalized composite gradient profile (e.g., an average or a normalized sum of the gradient profiles GPa and GPb) will be approximately as narrow as its constituent profiles, and will indicate the average or representative location of the edge 325 with good fidelity. For example, forming a composite gradient profile may be particularly advantageous if the gradient profiles GPa and GPb each contain noise due to a noisy or randomly irregular edge, but the edge 325 is known or assumed to be straight. In such a case the composite gradient profile will most likely provide a better estimate of the location of the edge 325 than the individual gradient profiles.

In contrast to FIG. 3A, FIG. 3B shows a field of view window 300 including an image of the workpiece 20 wherein the edge 325 is rotated or "misaligned" relative to the region of interest ROI' and/or the scan lines SLa' and SLb'. A dashed line illustrates an edge orientation EO' of the edge 325 in the image, for purposes of explanation. For purposes of explanation, FIG. 3B also shows two parallel scan lines SLa' and SLb' similar to those shown in FIG. 3A. With the edge 325 assumed to be a straight edge, a misalignment angle MA is associated with an offset Oab' of the edge along one scan line relative to the other. In particular, sin(MA)*distance between scan lines=offset of edge between scan lines, as discussed further below.

The lower part of FIG. 3B is a chart 320 which shows intensity gradient profiles GPa' and GPb', at pixel locations (e.g., pixel numbers) along the scan lines SLa' and SLb', respectively. FIG. 3B shows an example where the region of interest is misaligned with the edge 325 and the scan lines are not perpendicular to the edge 325. Due to this misalignment, assuming the edge 325 is approximately straight and uniform, the gradient profile along the scan line SLb' will be offset from that along the scan line SLa', and the edge 325 will occur at a location along the scan lines SLa' and SLb'. This means that the edge 325 is offset along one of the scan lines relative to the other, that is, the offset Oab' of the edge along one scan line relative to the other will not be zero.

Because of these properties of scan lines that are misaligned relative to the edge, a normalized composite gradient profile (e.g., an average or a normalized sum of the gradient profiles GPa' and GPb') will include errors or artifacts due to the offset(s) of the edge location along the scan lines, and will not indicate the average or representative location of the edge 325 with good fidelity. For example, the composite gradient peak region will not be as narrow as its constituent peaks, and may exhibit spurious composite gradient peaks, as exhibited in the box 322.

From FIG. 3B, it may be seen that a gradient due to a closely spaced edge (e.g., the edge 326) may even be improperly combined with the desired edge for some misalignments (e.g., misalignments slightly greater than those illustrated). Such errors and artifacts impede the determination of an accurate representative edge location of the edge 325, particularly if it is a noisy edge. The offset(s) also impede the use of certain directional filtering and/or other processing operations than may be desirable for enhancing and/or distinguishing noisy edges and/or closely spaced edges, and the like. Thus, it may be desirable to provide an edge-referenced alignment compensation for various edge detection video tools, as disclosed herein.

In particular, it is desirable for an edge-referenced alignment compensation to either remove or compensate for the offset Oab', or the like, so that scan lines can be averaged or combined, or directional filtering or other techniques may be used to improve the detected or estimated location of noisy edges that have an approximately known shape, and/or the reliability of distinguishing among closely spaced edges, or both.

As previously outlined, in order to compensate the offset (if any) of one scan line relative to the next such that corresponding pixels of the scan lines are properly combined by a comparison or averaging or filtering operation, much of the benefit may be gained by using intensity data determined along an original scan line direction, and mathematically compensating for an offset between the scan lines (e.g., an offset expressed as the difference in location of the same workpiece feature along adjacent scan lines, expressed as a number of pixels with subpixel resolution), such that comparable features along the respective scan lines may be properly combined. In this case, the offset of an edge feature along various scan lines may be characterized by analyzing a plurality of the scan lines, and the characterized offset(s) may be considered as the edge-referenced alignment compensation.

In some such embodiments, the edge measurement video tool is one of a box tool, a circle tool, and an arc tool, and characterizing the respective offset amount of the edge feature along respective scan lines comprises detecting edge points, fitting a line shape associated with the video tool to the edge points, and characterizing the respective offset amount of the fitted line along respective scan lines. When the video tool is a box tool, the respective scan lines may be parallel to one another, the line shape associated with the video tool is a straight line, and characterizing the respective offset amount of the fitted line along respective scan lines may comprise determining an angle between the fitted line and the respective scan lines. When the edge measurement video tool is a circle tool, the respective scan lines may all be along radii extending from a center of the circle tool, the line shape associated with the video tool is circle, and characterizing the respective offset amount of the fitted line along respective scan lines may comprise determining where the fitted circle intersects the respective scan lines.

In another embodiment, in order to determine an edge location most accurately, is advantageous to arrange the intensity scan line perpendicular to the edge (e.g., such that the edge width is minimized and/or the gradient across the edge is maximized). As outlined above, arranging an intensity scan line such that it is actually perpendicular to an edge may be performed computationally based on previously obtained image data. It will be appreciated that alternatively, a workpiece and camera may be rotated relative to one another, such that pixel rows or columns of the camera are define the scan line direction, and are oriented along a desired direction (e.g., perpendicular) relative to the edge on the workpiece, although this may be a time-consuming or impossible alternative in many machine vision systems and therefore may not be preferred in such systems. In either case, the adjustment of the intensity scan line direction such that it is actually perpendicular to the edge may be considered as the edge-referenced alignment compensation.

An intensity scan line that is actually arranged perpendicular to an edge may be computed based on previously obtained image data. Computing an intensity scan line along a desired direction based on previously obtained image data is taught for example in U.S. Pat. No. 7,567,713 to Ding, which is hereby incorporated herein by reference in its entirety. One alternative way of determining the proper direction of the scan line may include fitting a line to the edge and adjusting the orientation and/or position of the set of scan lines of the video tool such that the fit edge has the same offset along all scan lines, or the scan lines are perpendicular to the fitted line, or both. Known mathematics may be used to perform such operations.

In at least one embodiment, when the video tool is a box tool, the respective scan lines may be parallel to one another, the line shape associated with the video tool may be a straight line, and the angle between the fitted line and the respective scan lines may be determined and the scan lines adjusted to be perpendicular to the fitted line. In at least one embodiment, when the edge measurement video tool is a circle tool or an arc tool, the respective scan lines may all be along radii extending from a center of the circle or arc tool (or a scan line center), the line shape associated with the video tool may be a circle (or portion of a circle), and the center of the fitted circle may be determined relative to the center of the circle or arc tool or the scan line center. Then, the scan line center may be adjusted to coincide with the center of the fitted circle, and the adjusted scan line profile(s) computed.

Another alternative way of determining the proper direction of the scan lines may include performing a search that varies the orientation and/or position of a set of scan lines associated with a video tool and, for each orientation and/or position, forming a composite scan line by combining the data from scan lines along a direction parallel to an edge shape associated with a video tool, for example, summing or averaging scan line data along a direction perpendicular to the scan lines (e.g., along a straight or circular direction, or by summing or averaging corresponding pixel numbers along the scan lines). The resulting composite scan lines are evaluated. The orientation and/or position that provides the narrowest edge and/or the narrowest and/or highest edge gradient in the composite scan line, is the orientation and/or position that is used to determine scan lines that are approximately perpendicular to the edge that is to be detected.

This embodiment for determining proper scan line direction may be the most advantageous method when the objective is to distinguish between closely spaced edges, and particularly between closely spaced noisy edges within a region of interest. It may be used as a basis for various combinations of a scanline data such that data related to the various closely spaced edges can be more reliably grouped for analysis (e.g., statistical analysis to eliminate detected edge point outliers along a first edge, a second edge, and the like) with less risk of mistaking second-edge points for first-edge points, and vice versa. This will tend to define each edge (e.g., its detected edge points) most accurately, which should benefit any additional analysis performed based on the detected edge points, whether that analysis is intended to discriminate one edge from another or locate a particular edge most accurately, or the like.

It should be appreciated that when a part program is created the parameters characterizing a particular workpiece edge that is to be located by an edge detection video tool (also referred to as the "learned" edge parameters) will be based on video tool scan lines as they are oriented relative to the edge during learn mode. In contrast, when that part program is run to automatically detect the corresponding edge on a different workpiece during a run mode, the workpiece edge may be rotated to a slightly different angle relative to the programmed video tool, leading to a slightly different edge width and gradient along the runtime scan line, which makes it more likely that the learned edge parameters will fail to match the characteristics of the run mode scan lines.

It will be appreciated that for noisy edges in particular, reliable edge detection is inherently difficult, and the margin for such errors may be minimal. Therefore, to increase edge detection reliability in such cases, it may be desirable to ensure that the run mode scan line orientation relative to an edge feature is as similar as possible to the learn mode scan line orientation, which will increase the likelihood of a match between the learned edge parameters included in a part program and the observed edge characteristics during run mode. In this case, in one embodiment, the adjustment of the intensity scan line direction such that it is actually perpendicular to the edge during learn mode and/or run mode may be considered as the edge-referenced alignment compensation. In another embodiment, the actual orientation of the intensity scan line direction relative to the edge, or another characterization of the intensity scan line direction (e.g., a composite scan line intensity profile formed by assuming no offset between the scan lines inherently characterizes the intensity scan line direction relative to the edge) may be determined and recorded during learn mode, and then the run mode scan line orientation relative to the edge may be adjusted to best match the actual scan line orientation or other characterization recorded during learn mode (e.g., a scan line, or composite scan line, intensity or gradient profile). In this case, the adjustment of the run mode scan line orientation relative to the edge such that it matches the actual scan line orientation relative to the edge or other scan line characterization recorded during learn mode may be considered as the edge-referenced alignment compensation.

In some embodiments, providing the edge-referenced alignment compensation comprises determining a learn mode composite scan line based on a plurality of contributing learn mode scan lines that include the respective offset amount of a representative learn mode edge feature along the respective contributing learn mode scan lines during a learn mode of the machine vision system, and operations corresponding to the method are stored in a part program including a stored representation of the learn mode composite scan line.

In some such embodiments, the method may further comprise executing the part program during a run mode of the machine vision system, comprising: adjusting the scan lines of an edge measurement video tool during the run mode based on determining a run mode composite scan line based on a plurality of run mode contributing scan lines that include the respective offset amount of a run mode edge feature corresponding to the representative learn mode edge feature along the respective run mode contributing scan lines, wherein the run mode scan lines are adjusted based on approximately maximizing a match of the run mode composite scan line to the learn mode composite scan line. In some such embodiments, the learn mode scan lines may be adjusted during learn mode such that a gradient corresponding to the representative edge feature in the learn mode composite scan line is approximately maximized.

In some embodiments, the learn mode and/or run mode scan line adjustments may be determined in a manner similar or identical to the search methods and composite scan line evaluation principles outlined above. During run mode, the composite scan line evaluation may include finding the composite scan line that best matches the corresponding recorded learn mode composite scan line (e.g., based on a correlation analysis or other known data/profile comparison techniques). Such a procedure is one way to provide a run mode offset amount for various scan lines that is substantially matched to a previously determined respective offset amount of a corresponding edge feature along respective scan lines (e.g., as determined during learn mode). In any case, such a procedure may increase the reliability of edge detection parameters determined for a learn mode workpiece and recorded in a part program when the part program is applied to similar workpieces during run mode.

As previously outlined, it will be appreciated that in some embodiments, scan lines may be defined relative to the video tool (e.g., the video tool region of interest) and adjustment of the scan lines may comprise adjustment of an element or feature of the region of interest. Thus, it will be appreciated that scan lines may be adjusted directly or indirectly in various embodiments.

FIGS. 4A-4D show a box tool 400 positioned for detecting a straight edge 425 in a workpiece image, including various video tool user interface embodiments for indicating the box tool status related to providing an edge-referenced alignment compensation that substantially eliminates offsets according to principles disclosed herein. As shown in FIGS. 4A-4D, the box tool comprises a user interface including at least a region of interest indicator ROIin superimposed on an image of the workpiece, and it provides an indication that the edge-referenced alignment compensation has been provided (or not been provided) that is superimposed on the image of the workpiece in the user interface. In some such embodiments, adjusting the user interface element may comprise changing a property of one or more elements that are superimposed on the image of the workpiece (e.g., their color, or line type, or the like), or adding or adjusting an edge-referenced alignment compensation indicator (e.g., the Edge-Referenced indicator ERin icon or widget) superimposed on the image.

Figure 4A:
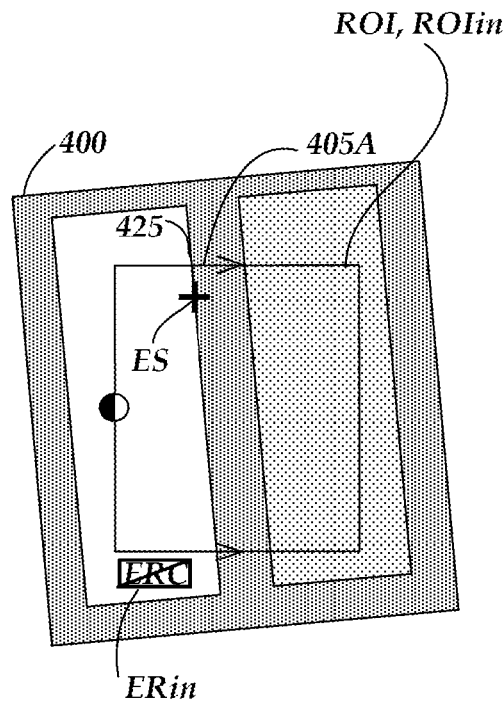
FIGS. 4A-4D show a box tool positioned for detecting a straight edge in a workpiece image, including various video tool user interface embodiments for indicating the box tool status related to providing an edge-referenced alignment compensation that substantially eliminates offsets according to principles disclosed herein.

As shown in FIG. 4A, the edge-referenced alignment compensation has not yet been provided (e.g., the tool has not yet been run or trained in learn mode or manual mode). As a result, the video tool GUI appears in an initial state (e.g., an untrained state). In some embodiments, the optional Edge-Referenced indicator ERin may be displayed in a state that indicates that the edge-referenced alignment compensation has not yet been provided. In other embodiments, the video tool GUI simply appears in its initial state.

Figure 4C:
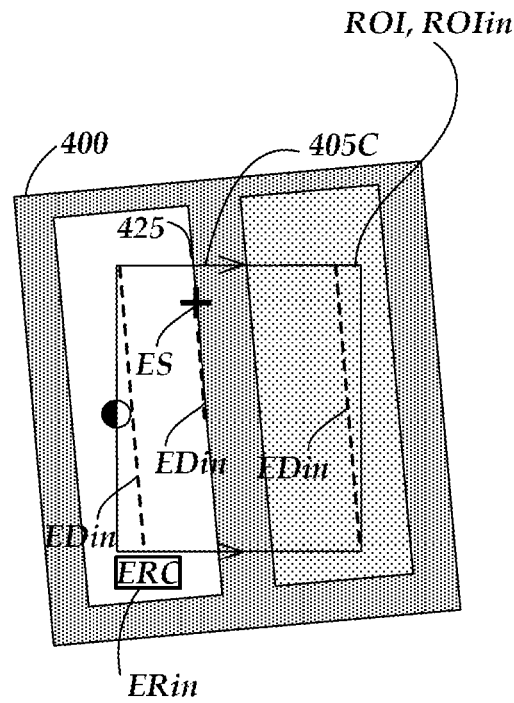
Figure 4B:
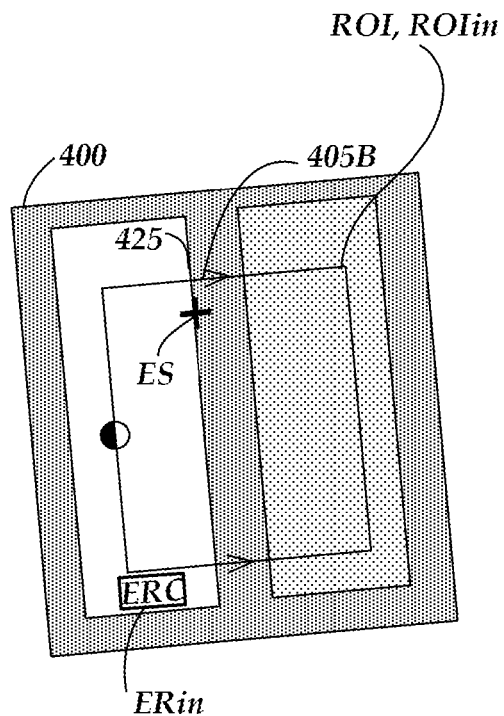
Figure 4D:
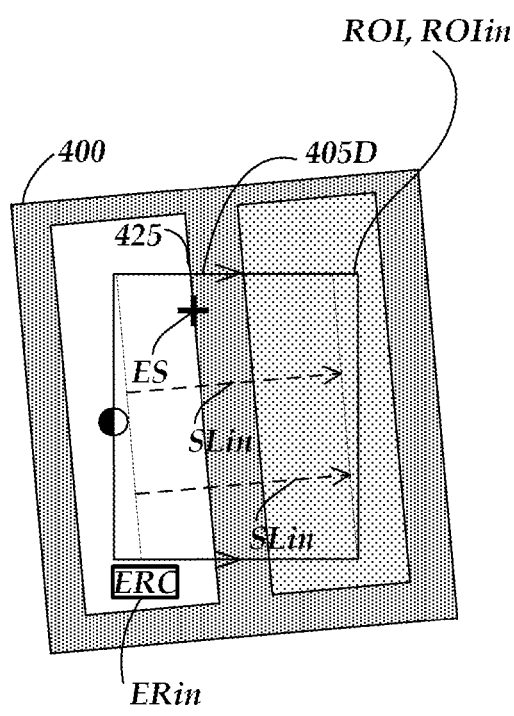

As shown in FIGS. 4B-4D, the edge-referenced alignment compensation has been provided (e.g., the tool has been run or trained in learn mode or manual mode). In this particular embodiment, internal operations of the video tool have eliminated the offset between scan lines (e.g., perpendicular scan lines have been computed perpendicular to the edge 425). As a result, in some embodiments, the optional Edge-Referenced indicator ERin may be displayed in a state that indicates that the edge-referenced alignment compensation has been provided. In other embodiments, the video tool GUI adjusts one of its elements relative to its initial state, in a manner that suggests that the edge-referenced alignment compensation has been provided.

For example, in FIG. 4B the video tool 400, which is a box tool, adjusts the user interface by rotating the region of interest indicator such that one of its axes is perpendicular to the edge feature, in FIG. 4C it provides and/or rotates one or more edge direction indicator(s) EDin such that it is parallel to the edge feature 425, and in FIG. 4D it provides and/or rotates one or more scan line direction indicator(s) SLin such that it is perpendicular to the edge feature 425.

FIGS. 5A-5D show an arc tool 500 positioned for detecting a circular edge portion 525 in a workpiece image, including various video tool user interface embodiments for indicating the arc tool status related to providing an edge-referenced alignment compensation that substantially eliminates offsets according to principles disclosed herein. FIGS. 5A-5D are analogous to FIGS. 4A-4D and may be similarly understood, therefore only a brief description will be provided.

Figure 5A:
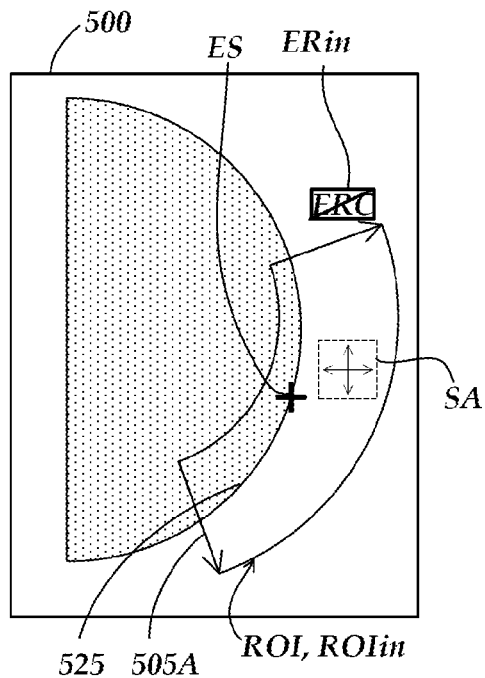
FIGS. 5A-5D show an arc tool positioned for detecting a circular edge portion in a workpiece image, including various video tool user interface embodiments for indicating the arc tool status related to providing an edge-referenced alignment compensation that substantially eliminates offsets according to principles disclosed herein.
Figure 5C:
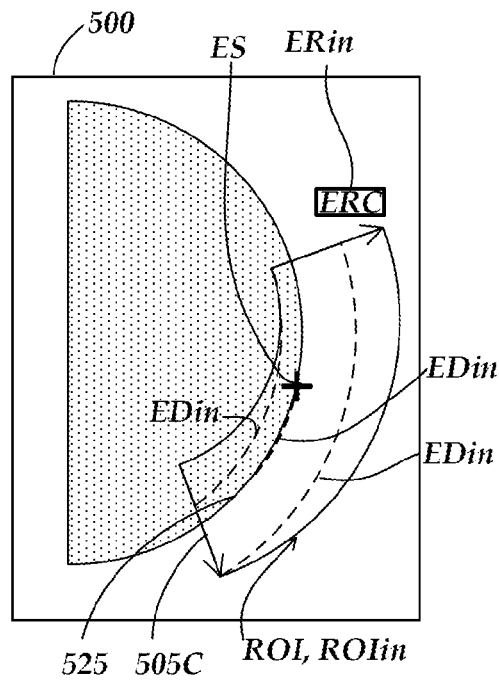
Figure 5B:
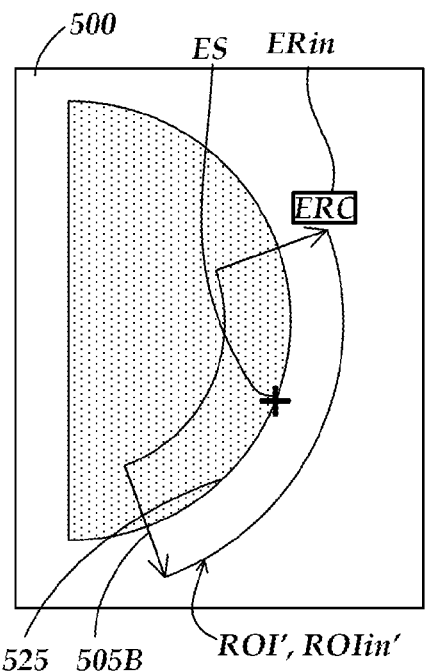
Figure 5D:
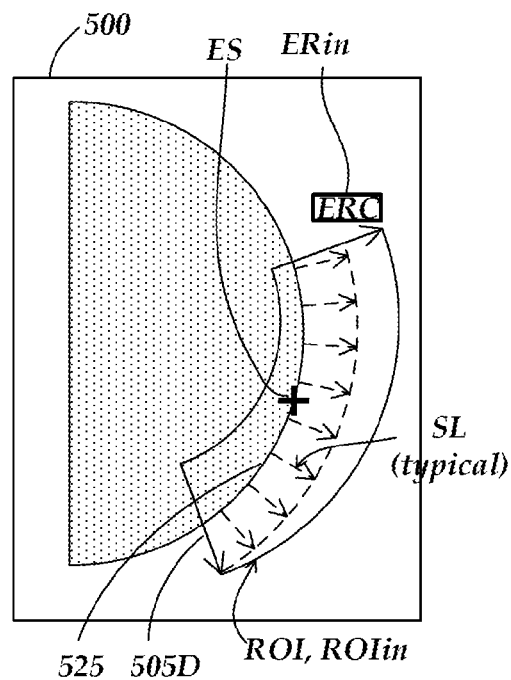

The arc tool 500 comprises a user interface including a region of interest indicator ROIin superimposed on an image of the workpiece. As shown in FIG. 5A, the edge-referenced alignment compensation has not yet been provided. As a result, the video tool GUI appears in an initial state (e.g., an untrained state). In some embodiments, the optional Edge-Referenced indicator ERin may be displayed in a state that indicates that the edge-referenced alignment compensation has not yet been provided. In other embodiments, the video tool GUI simply appears in its initial state. As shown in FIGS. 5B-5D, the edge-referenced alignment compensation has been provided (e.g., the tool has been run or trained in learn mode or manual mode).

In this particular embodiment, internal operations of the video tool have eliminated the offset between scan lines (e.g., perpendicular scan lines have been computed perpendicular to the edge 525). As a result, in some embodiments, the optional Edge-Referenced indicator ERin may be displayed in a state that indicates that the edge-referenced alignment compensation has been provided. In other embodiments, the video tool GUI adjusts one of its elements relative to its initial state, in a manner that suggests that the edge-referenced alignment compensation has been provided. For example, in FIG. 5B the video tool 500 adjusts the user interface by positioning the region of interest indicator ROIin such that its boundaries are approximately concentric with the edge feature 525, in FIG. 5C it provides and/or positions the edge direction indicator(s) EDin such that it is approximately concentric with the edge feature, and in FIG. 5D it provides and/or positions the scan line indicator(s) SLin such that it is perpendicular to the edge feature. It will be appreciated that various embodiments of a circle tool may have analogous features to the arc tool embodiments shown in FIGS. 5A-5D.

FIG. 5A shows an exemplary optional search area indicator SA, which may be included in a user interface of various video tools to indicate a search area that is used for search procedures that adjust scan lines, as outlined previously. In some embodiments, a user may adjust the size of the search area (e.g., by dragging a side or corner) to cause a faster search (e.g., a smaller search area) or a more robust search (e.g., a larger search area).

As outlined previously, in some embodiments the edge-referenced alignment compensation determines the respective offset amount(s) along various scan lines, and it is used to adjust the scan line data such that the respective offset amount of the edge feature along respective scan lines is substantially compensated as outlined previously. In such embodiments, adjusting the user interface element may comprise adjusting at least one of the region of interest indicator, an edge direction indicator, and a display representing detected edge points, to symbolically represent the respective offset amount(s). FIGS. 6A-6D and FIGS. 7A-7D show user interface features which may be used in such embodiments.

Figure 6A:
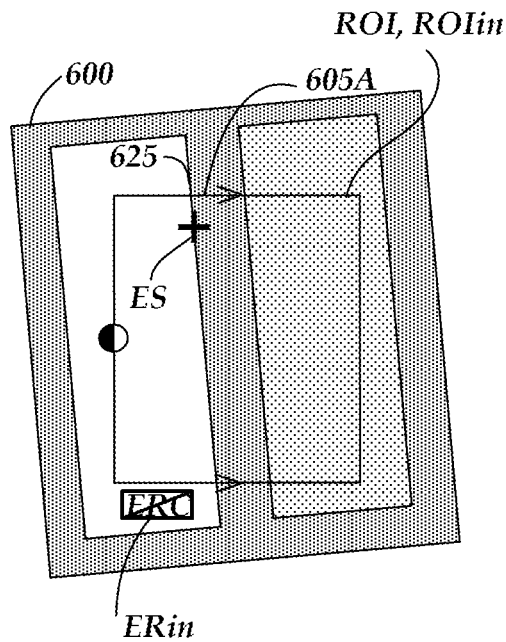
FIGS. 6A-6D show a box tool positioned for detecting a straight edge in a workpiece image, including various video tool user interface embodiments for indicating the box tool status related to providing an edge-referenced alignment compensation that substantially compensates offsets according to principles disclosed herein.

FIGS. 6A-6D are in a general way analogous to FIGS. 4A-4D and may be similarly understood, therefore only a brief description will be provided. The box tool 600 comprises a user interface including a region of interest indicator ROIin superimposed on an image of the workpiece. As shown in FIG. 6A, the edge-referenced alignment compensation has not yet been provided. As a result, the video tool GUI appears in an initial state (e.g., an untrained state). In some embodiments, the optional Edge-Referenced indicator ERin may be displayed in a state that indicates that the edge-referenced alignment compensation has not yet been provided. In other embodiments, the video tool GUI simply appears in its initial state.

Figure 6C:
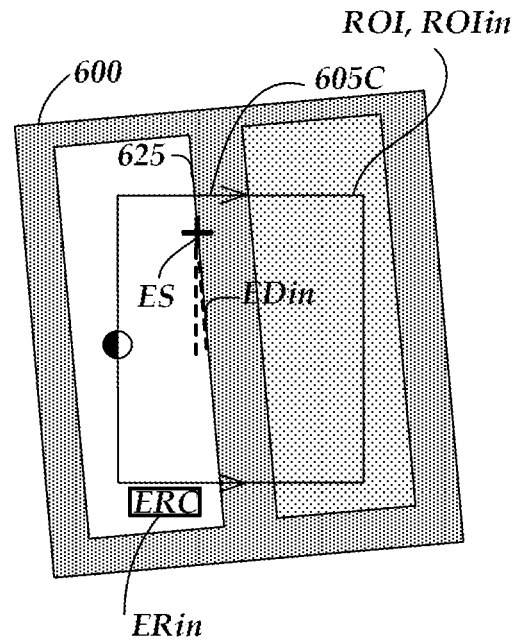
Figure 6B:
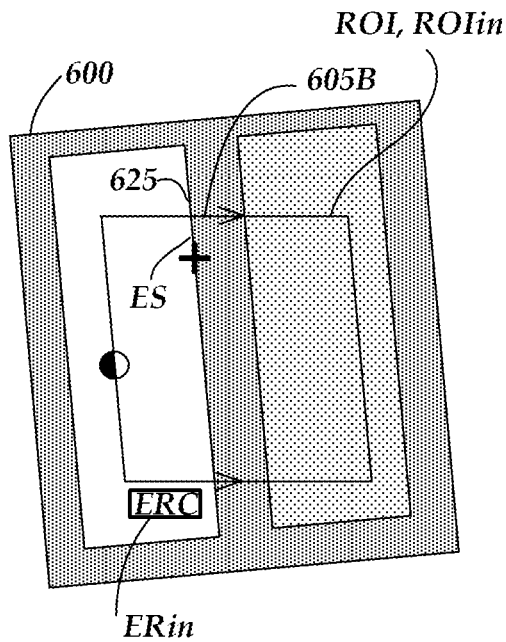
Figure 6D:
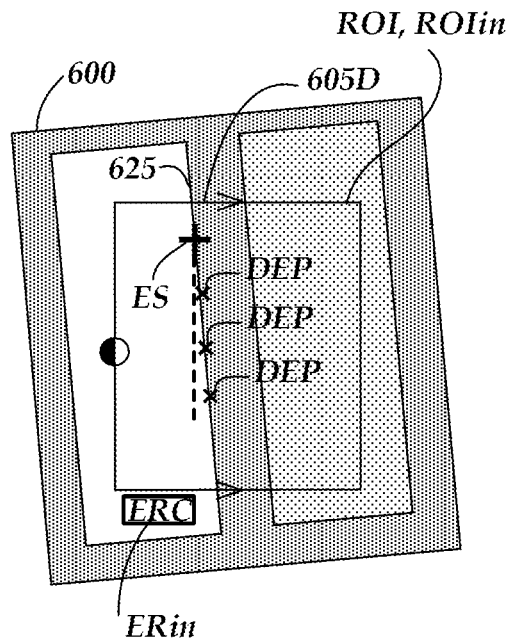

As shown in FIGS. 6B-6D, the edge-referenced alignment compensation has been provided (e.g., the tool has been run or trained in learn mode or manual mode). In this particular embodiment, internal operations of the video tool have determined the offset between scan lines (e.g., such that it may be computationally compensated as outlined previously). As a result, in some embodiments, the optional Edge-Referenced indicator ERin may be displayed in a state that indicates that the edge-referenced alignment compensation has been provided. In other embodiments, the video tool GUI adjusts one of its elements relative to its initial state, in a manner that suggests that the edge-referenced alignment compensation has been provided. For example, in FIG. 6B the video tool 600 adjusts the user interface by shaping the region of interest indicator ROIin to include a side approximately parallel to the edge feature 625, in FIG. 6C it provides and/or positions the edge direction indicator EDin such that it is parallel to the edge feature 625 and/or indicates an angle between the edge feature 625 and a line indicative of the scan line orientation, and in FIG. 6D it provides and/or positions a detected edge point representation(s) DEP, or a line fit to the detected edge points, approximately along the edge feature.

Figure 7A:
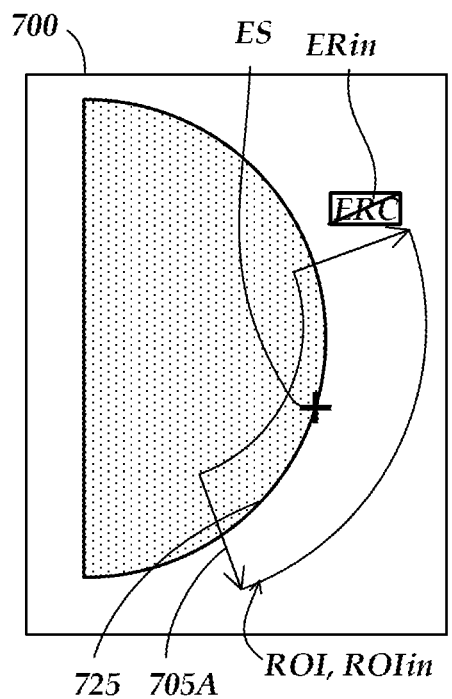
FIGS. 7A-7D show an arc tool positioned for detecting a circular edge portion in a workpiece image, including various video tool user interface embodiments for indicating the arc tool status related to providing an edge-referenced alignment compensation that substantially compensates offsets according to principles disclosed herein.

FIGS. 7A-7D are in a general way analogous to FIGS. 5A-5D and may be similarly understood, therefore only a brief description will be provided. The arc tool 700 comprises a user interface including a region of interest indicator ROIin superimposed on an image of the workpiece. As shown in FIG. 7A, the edge-referenced alignment compensation has not yet been provided. As a result, the video tool GUI appears in an initial state (e.g., an untrained state). In some embodiments, the optional Edge-Referenced indicator ERin may be displayed in a state that indicates that the edge-referenced alignment compensation has not yet been provided. In other embodiments, the video tool GUI simply appears in its initial state.

Figure 7B:
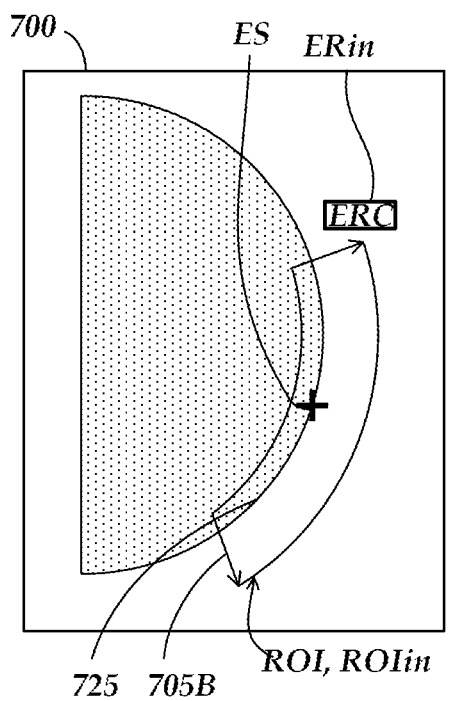
Figure 7C:
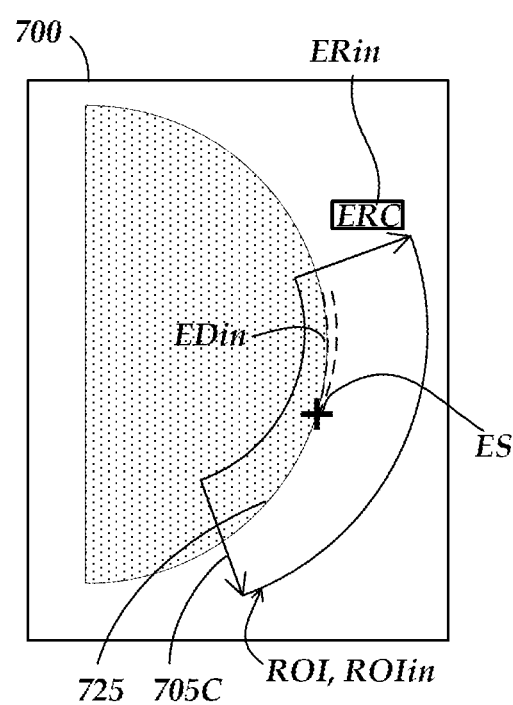
Figure 7D:
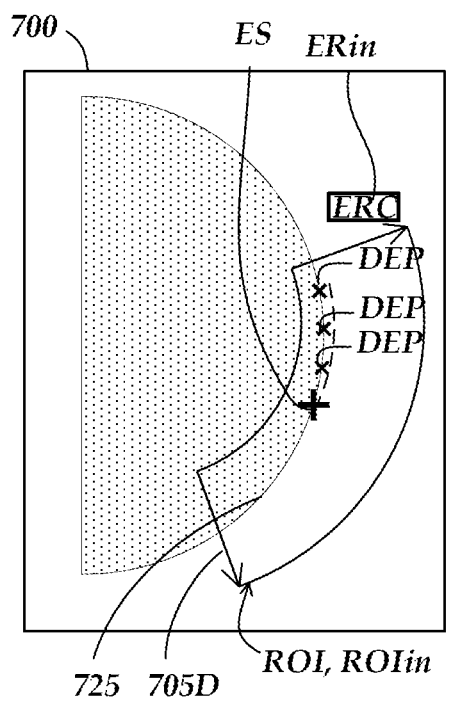

As shown in FIGS. 7B-7D, the edge-referenced alignment compensation has been provided (e.g., the tool has been run or trained in learn mode or manual mode). In this particular embodiment, internal operations of the video tool have determined the offset between scan lines (e.g., such that it may be computationally compensated as outlined previously). As a result, in some embodiments, the optional Edge-Referenced indicator ERin may be displayed in a state that indicates that the edge-referenced alignment compensation has been provided.

In other embodiments, the video tool GUI adjusts one of its elements relative to its initial state, in a manner that suggests that the edge-referenced alignment compensation has been provided. For example, in FIG. 7B the video tool 700 adjusts the user interface by shaping the region of interest indicator ROIin such that its curved boundaries are approximately concentric with the edge feature 725, in FIG. 7C it provides and/or positions the edge direction indicator EDin such that its curve is approximately concentric or coincident with the edge feature 725 and/or indicates an angle between the edge feature 725 and a line indicative of the scan line orientation, and in FIG. 7D it provides and/or positions a detected edge point representation(s) DEP, or a line fit to the detected edge points, approximately along the edge feature.

In various embodiments, implementation of the edge references alignment compensation methods disclosed herein may comprise one of (a) selecting the edge measurement video tool such that it is a type that includes edge-referenced alignment compensation operations, (b) selecting an edge-referenced alignment compensation mode or option of the edge measurement video tool which includes edge-referenced alignment compensation operations, (c) selecting a directional filtering mode or option of the edge measurement video tool which includes edge-referenced alignment compensation operations, and (d) selecting an edge-referenced alignment compensation tool that provides edge-referenced alignment compensation operations that operate in conjunction with the edge measurement video tool. In such embodiments, the step of analyzing the plurality of scan lines in order to provide the edge-referenced alignment compensation may comprise executing the edge-referenced alignment compensation operations in conjunction with operations of the edge measurement video tool.

In some cases, the method is performed during a learn mode of the machine vision system and corresponding operations are recorded in a part program. In other cases, at least some steps of the method are performed during a run mode of the machine vision system by executing corresponding operations recorded in a part program.

In some embodiments, the method may further comprise applying the edge-referenced alignment compensation to adjust the scan line data of the edge measurement video tool such that the respective offset amount of the edge feature along respective scan lines as reflected in the detected edge points of the edge measurement video tool is at least one of (a) substantially zero, (b) substantially compensated, and (c) substantially matched to a previously determined respective offset amount of a corresponding edge feature along respective scan lines.

It will be appreciated that the edge-referenced alignment compensation status indicators shown in FIGS. 4A-7D are exemplary only, and not limiting.

Figure 8:
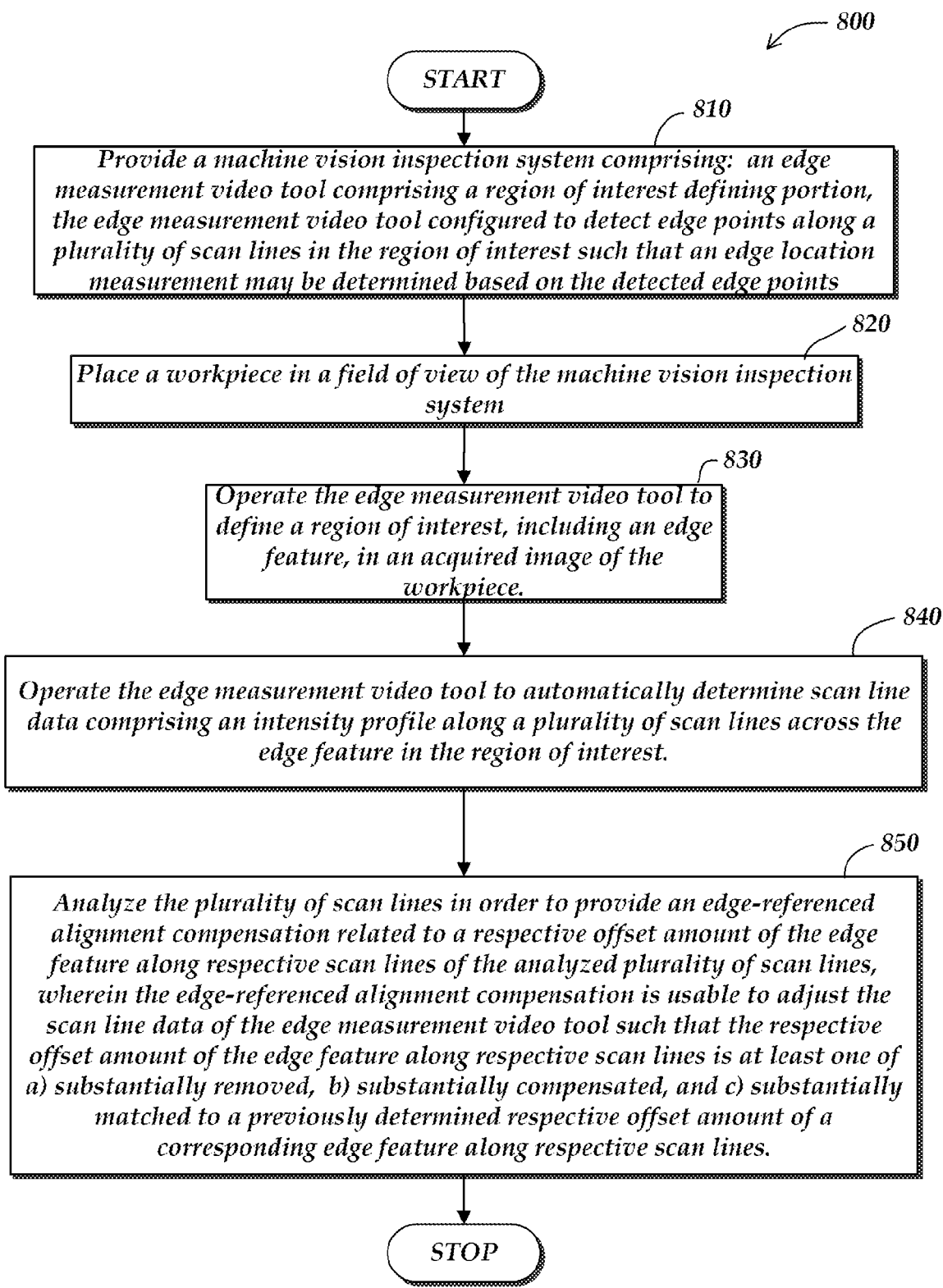
FIG. 8 is a flow diagram of a method for improving repeatability of edge location measurement results in a machine vision inspection system.

FIG. 8 is a flow diagram of a method for improving repeatability and/or robustness or reliability of edge location measurement results in a machine vision inspection system. At a block 810, a machine vision inspection system is provided. The machine vision inspection system may comprise an edge measurement video tool comprising a region of interest portion, the edge measurement video tool configured to detect edge points along a plurality of scan lines in the region of interest such that an edge location measurement may be determined based on the detected edge points. At a block 820, a workpiece is placed in a field of view of the machine vision inspection system. At a block 830, the edge measurement video tool is operated to define a region of interest including an edge feature, in an acquired image of the workpiece. At a block 840, the edge measurement video tool is operated to automatically determine an intensity profile along a plurality of scan lines across the edge feature in the region of interest. At a block 850, the plurality of scan lines is analyzed in order to provide an edge-referenced alignment compensation related to a respective offset amount of the edge feature along respective scan lines, wherein the edge-referenced alignment compensation is usable to adjust the scan line data of the edge measurement video tool such that the respective offset amount of the edge feature along respective scan lines is at least one of (a) substantially removed, (b) substantially compensated, and (c) substantially matched to a previously determined respective offset amount of a corresponding edge feature along respective scan lines. After the block 850, the process ends.

While various embodiments have been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The invention claimed is:

1. A method for improving repeatability in edge location measurement results of a machine vision inspection system, the machine vision inspection system comprising:
   an edge measurement video tool comprising a region of interest portion, wherein the edge measurement video tool is configured to detect edge points along a plurality of scan lines in the region of interest such that an edge location measurement may be determined based on the detected edge points;
   the method comprising:
      placing a workpiece in a field of view of the machine vision inspection system;
      operating the edge measurement video tool to define a region of interest, including an edge feature, in an acquired image of the workpiece;
      operating the edge measurement video tool to automatically determine scan line data comprising an intensity profile along a plurality of scan lines across the edge feature in the region of interest; and
      analyzing the plurality of scan lines in order to provide an edge-referenced alignment compensation related to a respective offset amount of the edge feature along respective scan lines of the analyzed plurality of scan lines, wherein the edge-referenced alignment compensation is usable to adjust the scan line data of the edge measurement video tool such that the respective offset amount of the edge feature along respective scan lines is at least one of (a) substantially removed, (b) substantially compensated, and (c) substantially matched to a previously determined respective offset amount of a corresponding edge feature along respective scan lines.

2. The method of claim 1, wherein the edge measurement video tool comprises a user interface including at least a region of interest indicator superimposed on an image of the workpiece, and the method further comprises providing an indication that the edge-referenced alignment compensation has been provided by adjusting an element that is superimposed on the image of the workpiece in the user interface.

3. The method of claim 2, wherein the edge-referenced alignment compensation is used to adjust the scan lines of the edge measurement video tool such that the respective offset amount of the edge feature along respective scan lines is substantially removed, and adjusting an element that is superimposed on the image of the workpiece in the user interface comprises adjusting at least one of the region of interest indicator, an edge direction indicator, and a scan line indicator to indicate that a scan line direction of the video tool is perpendicular to the edge feature.

4. The method of claim 3, wherein the video tool is a box tool, and adjusting the region of interest indicator comprises rotating the region of interest indicator such that one of its axes is perpendicular to the edge feature, adjusting the edge direction indicator comprises rotating the edge direction indicator such that it is parallel to the edge feature, and adjusting the scan line indicator comprises rotating the scan line indicator such that it is perpendicular to the edge feature.

5. The method of claim 3, wherein the video tool is one of a circle tool and an arc tool, and adjusting the region of interest indicator comprises positioning the region of interest indicator such that its boundaries are approximately concentric with the edge feature, adjusting the edge direction indicator comprises positioning the edge direction indicator such that it is approximately concentric with the edge feature, and adjusting the scan line indicator comprises positioning the scan line indicator such that it is perpendicular to the edge feature.

6. The method of claim 2, wherein the edge-referenced alignment compensation is used to adjust the scan line data of the edge measurement video tool such that the respective offset amount of the edge feature along respective scan lines is substantially compensated, and adjusting an element that is superimposed on the image of the workpiece in the user interface comprises adjusting at least one of the region of interest indicator, an edge direction indicator, and a display representing detected edge points, to symbolically represent the respective offset amount.

7. The method of claim 6, wherein the video tool is a box tool, and adjusting the region of interest indicator comprises shaping the region of interest indicator to include a side approximately parallel to the edge feature, adjusting the edge direction indicator comprises rotating the edge direction indicator such that it is at least one of (a) parallel to the edge feature and (b) indicative of an angle between the edge feature and a line indicative of the scan line orientation, and adjusting the display representing detected edge points comprises displaying the representation of detected edge points approximately along the edge feature.

8. The method of claim 6, wherein the video tool is one of a circle tool and an arc tool, and adjusting the region of interest indicator comprises shaping the region of interest indicator such that its boundaries are approximately concentric with the edge feature, adjusting the edge direction indicator comprises positioning the edge direction indicator such that it is approximately concentric with the edge feature, and adjusting the display representing detected edge points comprises displaying the representation of detected edge points approximately along the edge feature.

9. The method of claim 2, wherein adjusting an element that is superimposed on the image of the workpiece in the user interface comprises one of changing a property of an element that is superimposed on the image of the workpiece, or adding an edge-referenced alignment compensation indicator superimposed on the image.

10. The method of claim 1, wherein:
the method further comprises one of (a) selecting the edge measurement video tool such that it is a type that includes edge-referenced alignment compensation operations, (b) selecting an edge-referenced alignment compensation mode or option of the edge measurement video tool which includes edge-referenced alignment compensation operations, (c) selecting a directional filtering mode or option of the edge measurement video tool which includes edge-referenced alignment compensation operations, and (d) selecting an edge-referenced alignment compensation tool that provides edge-referenced alignment compensation operations that operate in conjunction with the edge measurement video tool; and
analyzing the plurality of scan lines in order to provide the edge-referenced alignment compensation comprises executing the edge-referenced alignment compensation operations in conjunction with operations of the edge measurement video tool.

11. The method of claim 1, wherein the method is performed during a learn mode of the machine vision system and corresponding operations are recorded in a part program.

12. The method of claim 1, wherein at least some steps of the method are performed during a run mode of the machine vision system by executing corresponding operations recorded in a part program.

13. The method of claim 1, further comprising:
applying the edge-referenced alignment compensation to adjust the scan line data of the edge measurement video tool such that the respective offset amount of the edge feature along respective scan lines as reflected in the detected edge points of the edge measurement video tool is at least one of (a) substantially zero, (b) substantially compensated, and (c) substantially matched to a previously determined respective offset amount of a corresponding edge feature along respective scan lines.

14. The method of claim 1, wherein providing the edge-referenced alignment compensation comprises characterizing the respective offset amount of the edge feature along respective scan lines.

15. The method of claim 14, wherein the edge measurement video tool is one of a box tool, a circle tool, and an arc tool, and characterizing the respective offset amount of the edge feature along respective scan lines comprises detecting edge points, fitting a line shape associated with the video tool to the edge points, and characterizing the respective offset amount of the fitted line along respective scan lines.

16. The method of claim 15, wherein the edge measurement video tool is a box tool, the respective scan lines are parallel to one another, the line shape associated with the video tool is a straight line, and characterizing the respective offset amount of the fitted line along respective scan lines comprises determining an angle between the fitted line and the respective scan lines.

17. The method of claim 15, wherein the edge measurement video tool is a circle tool, the respective scan lines are along radii extending from a center of the circle tool, the line shape associated with the video tool is circle, and characterizing the respective offset amount of the fitted line along respective scan lines comprises determining where the fitted circle intersects the respective scan lines.

18. The method of claim 1, wherein providing the edge-referenced alignment compensation comprises adjusting the scan lines of the edge measurement video tool such that the scan lines are substantially perpendicular to the edge feature.

19. The method of claim 1, wherein:

providing the edge-referenced alignment compensation comprises determining a learn mode composite scan line based on a plurality of contributing learn mode scan lines that include the respective offset amount of a representative learn mode edge feature along the respective contributing learn mode scan lines during a learn mode of the machine vision system, operations corresponding to the method are stored in a part program including a stored representation of the learn mode composite scan line, and the method further comprises:

executing the part program during a run mode of the machine vision system, comprising:

adjusting the scan lines of an edge measurement video tool during the run mode based on determining a run mode composite scan line based on a plurality of run mode contributing scan lines that include the respective offset amount of a run mode edge feature corresponding to the representative learn mode edge feature along the respective run mode contributing scan lines, wherein the run mode scan lines are adjusted based on approximately maximizing a match of the run mode composite scan line to the learn mode composite scan line.

20. The method of claim 19, wherein the learn mode scan lines are adjusted during learn mode such that a gradient corresponding to the representative edge feature in the learn mode composite scan line is approximately maximized.

\* \* \* \* \*